US007483033B2

(12) United States Patent
Enomoto

(10) Patent No.: US 7,483,033 B2
(45) Date of Patent: Jan. 27, 2009

(54) STORAGE DEVICE

(75) Inventor: Yasuhiro Enomoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 694 days.

(21) Appl. No.: 10/829,012

(22) Filed: Apr. 21, 2004

(65) Prior Publication Data

US 2004/0218227 A1 Nov. 4, 2004

(30) Foreign Application Priority Data

Apr. 30, 2003 (JP) ............................. 2003-125361

(51) Int. Cl.
*G06F 12/06* (2006.01)
*G09G 5/36* (2006.01)

(52) U.S. Cl. ...................................... 345/574; 345/559

(58) Field of Classification Search ............ 365/185.12; 345/570, 571, 574, 559; 358/426.01, 42; 382/245

See application file for complete search history.

(56) References Cited

U.S. PATENT DOCUMENTS

| | | | | |
|---|---|---|---|---|
| 3,941,922 | A | * | 3/1976 | Tsuchiya et al. ....... 358/426.12 |
| 4,035,837 | A | * | 7/1977 | Starck et al. ................. 358/539 |
| 4,086,620 | A | * | 4/1978 | Bowen et al. .......... 358/426.02 |
| 4,590,521 | A | * | 5/1986 | Rallapalli et al. ........... 358/444 |
| 4,591,829 | A | * | 5/1986 | Takeda .......................... 341/63 |
| 4,750,043 | A | * | 6/1988 | Hisada et al. ................ 382/234 |
| 4,755,974 | A | * | 7/1988 | Yamada et al. ................. 365/49 |
| 4,760,459 | A | * | 7/1988 | Sato et al. .................... 382/234 |
| 4,837,634 | A | * | 6/1989 | Hisada ................... 358/426.12 |
| 4,907,203 | A | * | 3/1990 | Wada et al. ............... 365/238.5 |
| 5,016,191 | A | * | 5/1991 | Radochonski ............... 345/596 |
| 5,303,200 | A | * | 4/1994 | Elrod et al. .............. 365/230.05 |
| 5,305,111 | A | * | 4/1994 | Chao et al. ................... 382/245 |
| 5,363,097 | A | * | 11/1994 | Jan .............................. 341/67 |

(Continued)

FOREIGN PATENT DOCUMENTS

EP 0564111 A2 * 10/1993

(Continued)

OTHER PUBLICATIONS

Japanese Patent Office: Notice of Reasons for Rejection for Application No. 2003-125361 (Mail Date: Sep. 9, 2008; 4 pgs.).

(Continued)

*Primary Examiner*—Ryan R Yang
(74) *Attorney, Agent, or Firm*—Pillsbury Winthrop Shaw Pittman LLP

(57) ABSTRACT

A storage device comprises a plurality of memory blocks each including a plurality of cells in correspondence with a data length of image data consisting of a plurality of pixel data, wherein a specific number of cells are simultaneously selected in order to commonly store a specific number of pixel data, each having a same value, which consecutively emerge in the image data. That is, they are defined between a first address and a second address, which is produced by adding run-length data representing the specific number of the first data consecutively repeated in the image data to the first address. Herein, the specific number of cells are limited within a specific storage unit, consisting of a predetermined number of cells, even though the first address and/or the second address is set outside of the specific storage unit.

3 Claims, 4 Drawing Sheets

U.S. PATENT DOCUMENTS

| | | | |
|---|---|---|---|
| 5,422,995 A * | 6/1995 | Aoki et al. | 345/545 |
| 5,465,304 A * | 11/1995 | Cullen et al. | 382/176 |
| 5,553,160 A * | 9/1996 | Dawson | 382/166 |
| 5,602,565 A * | 2/1997 | Takeuchi | 345/634 |
| 5,670,993 A * | 9/1997 | Greene et al. | 345/556 |
| 5,694,127 A * | 12/1997 | Tayama | 341/67 |
| 5,704,059 A * | 12/1997 | Ohno | 345/571 |
| 5,706,001 A * | 1/1998 | Sohn | 341/63 |
| 5,818,784 A * | 10/1998 | Muranaka et al. | 365/230.03 |
| 5,841,379 A * | 11/1998 | Seshan et al. | 341/63 |
| 5,844,915 A * | 12/1998 | Saitoh et al. | 714/719 |
| 5,920,883 A * | 7/1999 | Tamaki et al. | 711/101 |
| 6,104,208 A * | 8/2000 | Rangasayee | 326/40 |
| 6,130,850 A | 10/2000 | Ishikawa | |
| 6,292,017 B1 * | 9/2001 | Rangasayee | 326/40 |
| 6,411,394 B1 * | 6/2002 | Nakamura et al. | 358/1.15 |
| 6,583,887 B1 * | 6/2003 | Clouthier et al. | 358/1.15 |
| 6,738,310 B2 * | 5/2004 | Kato et al. | 365/233 |
| 2002/0027676 A1 * | 3/2002 | Okunishi et al. | 358/1.16 |

FOREIGN PATENT DOCUMENTS

| | | |
|---|---|---|
| JP | 61-007769 | 1/1986 |
| JP | 61007769 | 1/1986 |
| JP | 62-035775 | 2/1987 |
| JP | 03-211656 | 9/1991 |
| JP | 05-292331 | 11/1993 |
| JP | 10-124657 | 5/1998 |
| JP | 11-328948 | 11/1999 |

OTHER PUBLICATIONS

Japanese Patent Office: Notice of Reasons for Rejection for Application No. 2003-125361 (Mail Date: Sep. 9, 2008; 4 pgs.).

* cited by examiner

STORAGE DEVICE

BACKGROUND OF THE INVENTION

1. Field of the Invention

This invention relates to storage devices that perform write operations on serial data in association with memories.

This application claims priority on Japanese Patent Application No. 2003-125361, the content of which is incorporated herein by reference.

2. Description of the Related Art

Conventionally, facsimile machines (or telecopying machines) are designed to scan image data so as to produce serial data consisting of binary data representing white and black pixels, wherein when serial data are transmitted, they are subjected to compression using run-length coding (or run-length encoding). Japanese Patent Application Publication No. Hei 11-328948 discloses an example of a storage device that expands serial data into parallel data to be stored in memory arrays. According to this technology, serial data are sequentially input and are written into memory arrays, wherein write operation on the lastly input data into the memory array is increased in speed compared with write operation on the previous data in the memory array; thus, it is possible to reduce the overall data setup time so as to realize the high-speed write operation with respect to the memory arrays.

However, the aforementioned storage device is designed such that serial data are individually latched and are then written into the respective memory arrays, wherein the same data consecutively repeated in the serial data should be individually latched so that the same write operation should be repeated. For this reason, when serial data having a relatively large run length are stored in the storage device, it is very difficult to effectively increase the overall speed of writing them into the storage device.

SUMMARY OF THE INVENTION

It is an object of the invention to provide a storage device that can write serial data therein at a relatively high speed upon run-length coding.

A storage device of this invention is characterized by providing a plurality of memory blocks each having a plurality of cells, the number of which is determined in correspondence with the overall length (or overall width) of image data consisting of a plurality of first data (e.g., pixel data), and a selecting means for simultaneously selecting one of or two or more of the memory blocks on the basis of second data representing the number of the same first data (i.e., the same pixel data having the same value) consecutively repeated in the image data.

This allows the memory blocks to be simultaneously selected in parallel in order to store multiple first data each having the same value, which are thus expanded into parallel data to be stored in the memory blocks at once; hence, it is possible to realize high-speed write operation.

Specifically, the storage device (in particular, the aforementioned selecting means) comprises a first register for storing a first address designating a start point for storing multiple first data, an adder for adding the value of the second data to the first address, a second register for storing the addition result of the adder representing an end point for storing multiple first data as a second address, and a controller for selectively controlling the memory blocks to be simultaneously placed in a write-enable state based on the first and second addresses.

For example, the controller automatically selects the memory blocks to be simultaneously placed in a write-enable state on the basis of the relationship between the first and second addresses and in consideration of each storage unit consisting of multiple cells across multiple memory blocks, which is set in advance in correspondence with the length of the image data.

That is, when both of the first and second addresses belong to a specific storage unit, a specific range of cells are simultaneously selected within the specific storage unit. When the first address belongs to a specific storage unit but the second address belongs to its next unit storage, a specific range of cells, the first one of which is designated by the first address, are simultaneously selected within the specific storage unit. When both of the first and second addresses belong to other storage units outside of a specific storage unit, all cells of the specific storage unit are simultaneously selected. When the first address belongs to a storage unit outside of a specific storage unit but the second address belongs to the specific storage unit, a range of cells, the last one of which is designated by the second address, are simultaneously selected within the specific storage unit.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 1:
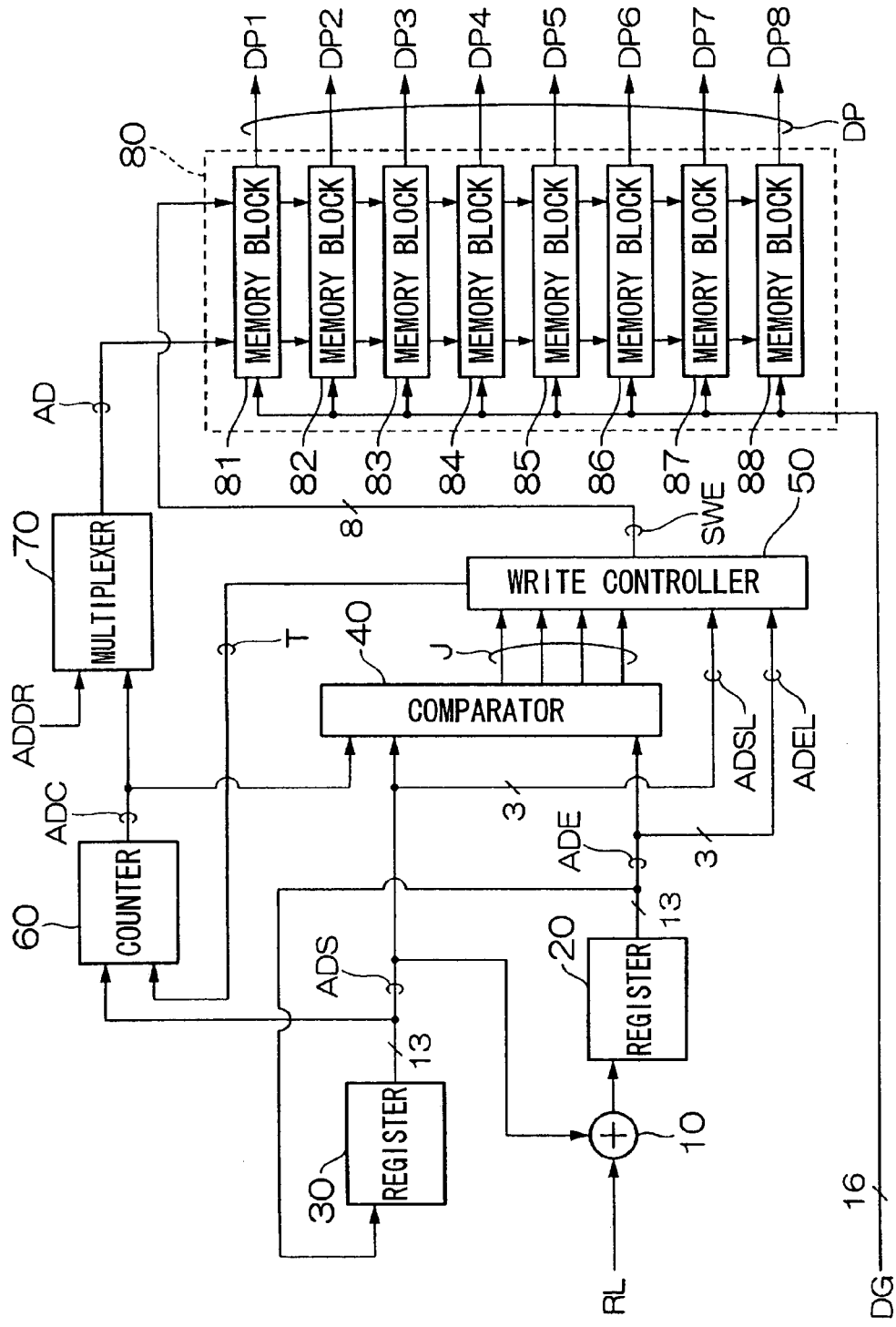
FIG. 1 is a block diagram showing the overall constitution of a storage device in accordance with a preferred embodiment of the invention.
Figures 2A, 2B:
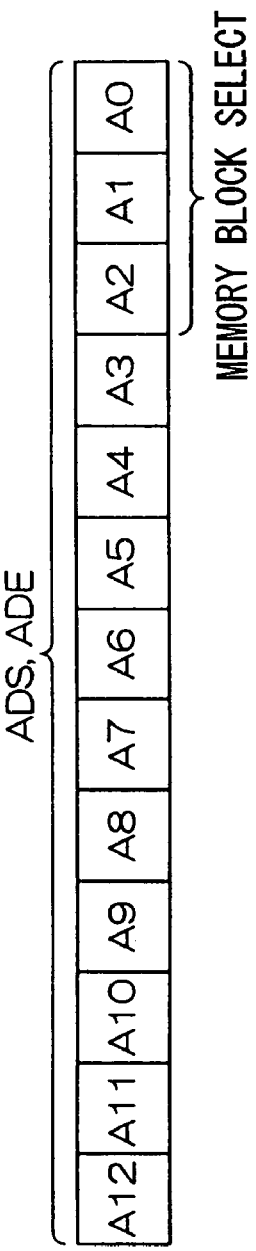
FIG. 2A shows an example of the relationship between pixel data and run-length data within serial data.
FIG. 2B shows an example of a 13-bit address ADS or ADE used in the storage device shown in FIG. 1.

FIG. 1 shows the constitution of a storage device in accordance with a preferred embodiment of the invention. This storage device is designed such that serial data DS representing image data are expanded into parallel data DP consisting of eight pixel data (DP1-DP8) each having a prescribed data length (or a data width), which are then stored in eight individual memories. In the present embodiment, the input serial data DS are subjected to run-length coding in advance, wherein as shown in FIG. 2A, they are converted into pixel data DG and run-length data RL representing a consecutively repeated number of pixel data (namely, a run length), which are given from an external device (not shown). Herein, each pixel data DG consists of sixteen bits, for example.

In FIG. 1, reference numeral 10 designates an adder; reference numerals 20 and 30 designate registers; reference numeral 40 designates a comparator; reference numeral 50 designates a write controller; reference numeral 60 designates a counter; reference numeral 70 designates a multiplexer; and reference numeral 80 designated a memory array. Herein, all of the adder 10, registers 20 and 30, comparator 40, write controller 50, and counter 60 function as a storage area selecting means, wherein they cooperate together to select one of or to simultaneously select two or more of memory blocks 81-88 contained in the memory array 80 into which pixel data should be written on the basis of the run-length data RL. The memory array 80 is a storage means providing the eight memory blocks 81-88 in accordance with the data length of each parallel data DP, wherein the same pixel data DG is commonly supplied to each of the memory blocks 81-88.

FIG. 2A shows the relationship between the pixel data DG and the run-length data RL, wherein the pixel data DG show various values, namely, '5', '8', '0', '4', '2', '0', '1', and '2', in connection with various values of the run-length data RL, namely, '1', '1', '8', '1', '1', '2', '1', and '1' respectively. This example indicates that after pixel data of '5' and '8' consecutively emerge once in the serial data prior to run-length coding, the same pixel data of '0' repeatedly emerge eight times. That is, due to the run-length coding, a plurality of the same pixel data (having the same value) consecutively repeated and contained the serial data DS are replaced with 'single' pixel data accompanied with its run-length data; thus, it is possible to noticeably reduce the overall amount of data contained in the serial data DS.

With reference to FIG. 1, the run-length data RL is supplied to a first input terminal of the adder 10, a second input terminal of which receives an address ADS being output from the register 30, which will be described later. The output signal of the adder 10 is supplied to the register 20, which in turn outputs an address signal ADE to the comparator 40 and the register 30 respectively, wherein an address ADEL consisting of low-order three bits of the address signal ADE is delivered to the write controller 50. Upon receipt of the address signal ADE, the register 30 outputs the address signal ADS, which is delivered to the adder 10, comparator 40, and counter 60 respectively, wherein an address signal ADSL consisting of low-order three bits of the address signal ADS is supplied to the write controller 50. As shown in FIG. 2B, each of the address signals ADE and ADS consists of thirteen bits, namely, A0-A12, wherein low-order three bits A0-A2 designate at least one of the eight memory blocks 81-88 to be selected.

The counter 60 outputs an address ADC, which is delivered to the comparator and a first input terminal of the multiplexer 70, a second input terminal of which receives an read address ADDR. Thus, the multiplexer 70 outputs an address AD, which is commonly supplied to the eight memory blocks 81-88 contained in the memory array 80. The comparator 40 provides an output signal J (consisting of four bits, for example) to the write controller 50, which in turn outputs a write control signal SWE (of eight bits) to the memory array 80. In addition, the write controller 50 provides the counter 60 with a trigger signal T for use in count-up operation.

Figure 3:
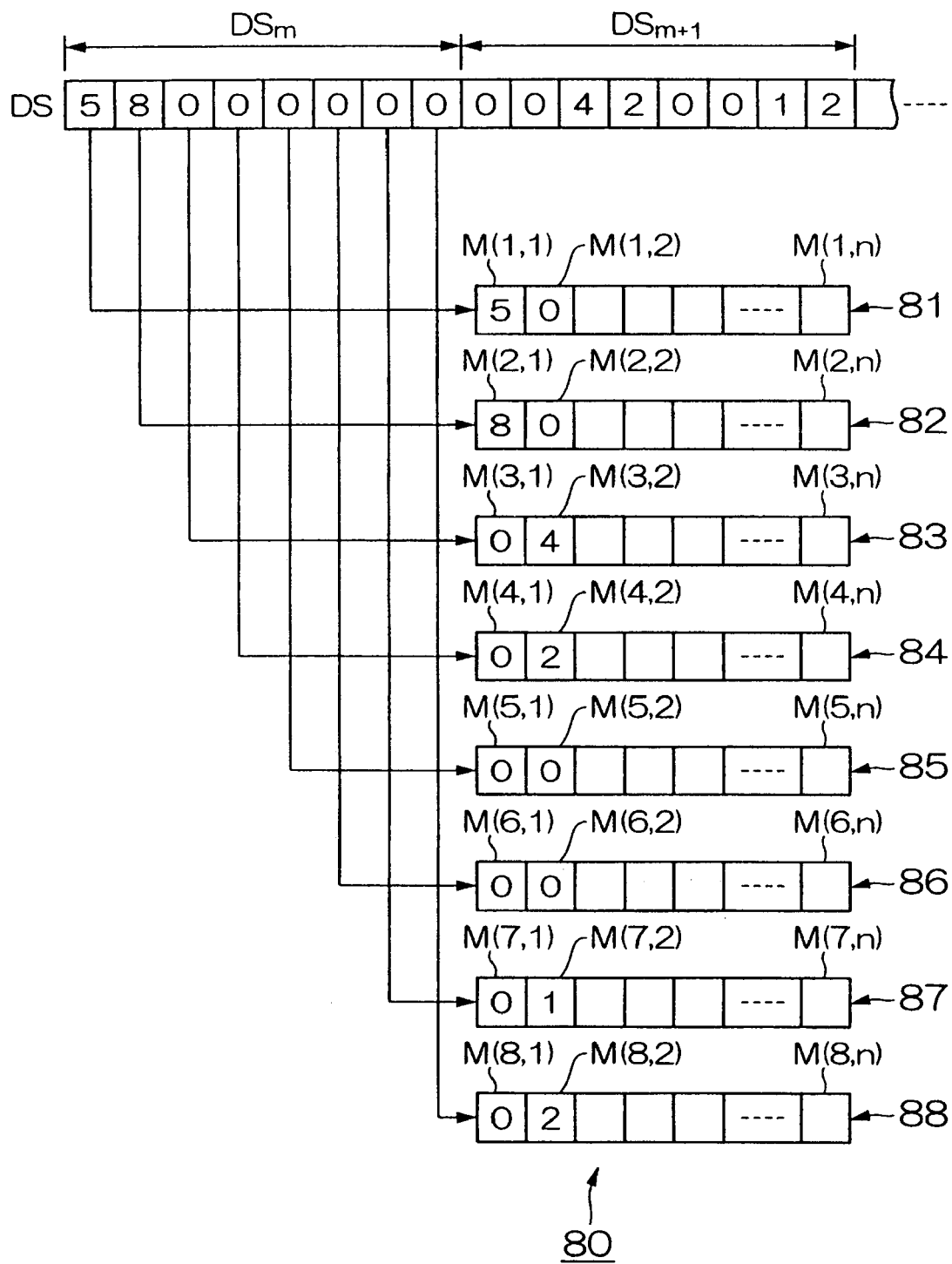
FIG. 3 is a simple block diagram showing an example of the correspondence relationship between serial data and storage locations therefor in a memory array shown in FIG. 1.

Each of the memory blocks 81-88 contained in the memory array 80 has a prescribed storage area that is capable of storing data of 'n' pixels (where 'n' is a natural number arbitrarily selected). The present embodiment defines a storage area for single pixel data as a "cell"; that is, a single cell stores single pixel data (of sixteen bits). FIG. 3 shows the detailed constitution of the memory array 80 in which the memory block 81 consists of 'n' cells, i.e., M(1,1) to M(1,n). Similarly, each of the memory blocks 82-88 consists of 'n' cells, ranging from M(2,1) to M(8,n). Thus, the memory array 80 provides the numerous number of cells, i.e., M(1,1) to M(8,n) in total, which are arranged in a matrix form of 8×n. The aforementioned eight memory blocks 81-88 are arranged in correspondence with the data length of 'single' parallel data DP, that is, the number of pixel data contained in single parallel data DP.

Prescribed addresses, which are incremented in the column direction, are assigned to the cells M(1,1) to M(8,n) that are arranged in the matrix form of 8×n, wherein they are consecutively serially numbered with respect to all columns. That is, in the case of FIG. 3, a top address is assigned to the first cell M(1,1) in the first column, and its consecutive addresses are respectively assigned to the following cells M(2,1), M(3,1), M(4,1), . . . , and M(8,1) in the first column, wherein all the addresses assigned to the eight memory cells in the first column are each incremented by '1'. In addition, an address next to the address assigned to the last cell M(8,1) in the first column is assigned to the first cell M(1,2) in the second column. Similarly, addresses respectively assigned to the other cells belonging to the third to n-th columns are each incremented by '1'. As a result, addresses respectively assigned to all cells in all columns are made consecutive and are each incremented by '1'.

Next, the overall operation of the storage device of the present embodiment will be described in detail.

With reference to FIG. 3, a description will be given with respect to the correspondence relationship between the image data of the serial data DS and the storage locations in the memory array 80. That is, FIG. 3 diagrammatically shows an example of the correspondence relationship between the image data of the serial data DS and the storage locations of the memory array 80. Herein, the serial data DS are stored in cells of each column of the memory array 80 by each unit of a prescribed number of pixel data corresponding to the number of the memory blocks 81 to 88. For example, eight pixel data form a data string DSm in the serial data DS, wherein they are set to '5', '8', '0', '0', '0', '0', '0', and '0' and are respectively stored in the cells M(1,1), M(2,1), M(3,1), M(4,1), M(5,1), M(6,1), M(7,1), and M(8,1). In other words, the data string DSm is expanded into parallel data consisting of eight data values, which are respectively stored in the eight cells of the first column in the memory array 80.

In addition, eight pixel data form the next data string DSm+1 subsequent to the aforementioned data string DSm in the serial data DS, wherein they are set to '0', '0', '4,', '2', '0', '0', '1', and '2' and are respectively stored in the cells M(1,2), M(2,2), M(3,2), M(4,2), M(5,2), M(6,2), M(7,2), and M(8,2). That is, similar to the data string DSm, the data string DSm+1 is expanded into parallel data consisting of eight data values, which are respectively stored in the eight cells in the second colum of the memory array 80. Similarly, other data strings next to the data string DSm+1 are respectively expanded into parallel data, which are then stored in the cells belonging to the third to n-th columns in the memory array 80. In short, each column of cells of the memory array 80 forms each unit of a storage area corresponding to the overall data length of the parallel data PD, wherein the serial data DS are expanded into parallel data consisting of eight pixel data, which are respectively stored in the eight cells of each column in the memory array 80.

Next, the detailed operation of the storage device shown in FIG. 1 will be described with respect to the write operation for storing the data string DSm into the first column of the memory array 80.

First, the overall operation of the storage device of FIG. 1 will be briefly described. That is, the storage device operates to collectively write plural pixel data, having the same value consecutively repeated therein, into a plurality of memory blocks. These memory blocks for collectively writing the same value consecutively repeated in the pixel data are designated by the aforementioned addresses stored in the registers 20 and 30, whereby the write controller 50 controls these memory blocks to be simultaneously placed in a write-enable state. Specifically, the register 30 stores the address for designating the first memory cell corresponding to a start-point location of the storage area for storing the pixel data, while the register 20 stores the address for designating the last memory cell corresponding to an end-point location of the storage area for storing the pixel data. That is, all of the memory cells belonging the range defined between the addresses respectively designated by the registers 30 and 20 are controlled to be simultaneously placed in a write-enable state. When plural pixel data of the same value are stored in memory cells over plural columns of the memory array 80, the address ADC output from the counter 60 is incremented so as to change over the columns from one to another.

Next, operations of the aforementioned sections of the storage device of FIG. 1 will be described in detail. In the initial condition, both of the registers 20 and 30 are reset, so that all bits of the addresses ADE and ADS output therefrom are set to '0'. In addition, the counter 60 is reset as well, so that all bits of the address ADC output therefrom are set to '0'. Furthermore, the multiplexer 70 selects the address ADC output from the counter 60 in a write mode, while it selects the address ADDR given from the external device in a read mode. The following description is given mainly with respect to the write operation; hence, the multiplexer 70 normally selects the address ADC output from the counter 60. The write control signal SWE output from the write controller 50 is placed in an inactive state; hence, all of the memory blocks 81-88 of the memory array 80 receiving it are placed so as not to allow data write operations therein.

In the initial condition, when the external device such as a CPU outputs the image data DG to the storage device of FIG. 1, the top pixel data '5' shown in FIG. 2A is commonly supplied to the memory blocks 81-88 of the memory array 80. In this stage, all of the memory blocks 81-88 are placed so as not to allow data write operations therein; therefore, the pixel data '5' cannot be written into any one of the memory blocks 81-88.

In addition, run-length data RL having a value '1' representing the number of the pixel data '5' consecutively repeated in the image data DG is supplied to the adder 10, by which the value '1' is added to the address ADS output from the register 30, so that the addition result is output to the register 20, which thus outputs the address ADE incremented by '1'.

The comparator 40 compares the address ADS with the address ADE, which is greater than ADS by '1', so as to produce a signal J representing the comparison result thereof. The signal J is supplied to the write controller 50, wherein since a difference between the address ADE and the address ADS is '1', the write control signal SWE controls the memory blocks 81-88 such that only the memory block 81 designated by the address ADSL, consisting of low-order three bits of the address ADS, is placed in a write-enable state. Thus, the aforementioned pixel data '5' is written into the memory block 81.

Thereafter, the address ADE presently output from the register 20 is transferred to the register 30, whereby the value '1' of the address ADE designating the last memory block is now set to the address ADS designating the first memory block.

Next, the external device provides the storage device of FIG. 1 with the next pixel data '8' accompanied with the run-length data RL (i.e., '1') representing the number of the pixel data '8' consecutively repeated in the image data DG. Since the address ADS output from the register 30 is presently set to '1', the adder 10 adds it to run-length data RL (i.e., '1') so as to produce the addition result (i.e., '2'), which is forwarded to the register 20. In this case, the comparator 40 outputs a signal J declaring that the difference between the address ADS and the address ADE still remains at '1'; hence, the write controller 50 receiving the signal J controls the memory blocks 81-88 such that only the memory block 82 designated by the address ADSL consisting of low-order three bits of the address ADS is placed in a write-enable state. Thus, the pixel data '8' is written into the memory block 82.

Thereafter, the address ADE presently output from the register 20 is transferred to the register 30; thus, the value '2' of the address ADE designating the last memory block is now set to the address ADS designating the first memory block.

Next, the external device provides the storage device of FIG. 1 with the pixel data '0' accompanied with the run-length data RL (i.e., '8') representing the number of the pixel data '0' consecutively repeated in the image data DG. Since the register 30 presently outputs the address ADS having the value '2', the adder 10 adds it to the value '8' of the run-length data RL so as to produce the addition result (i.e., '10'), which is forwarded to the register 20. That is, the comparator 40 receives the value '2' of the address ADS and the value '10' of the address ADE.

In this case, the difference between the address ADS and the address ADE is '8' that is far greater than the foregoing value '1', so that the comparator 40 designates the unit of the storage area for storing the parallel data and selects the corresponding memory blocks, which should be controlled to be placed in a write-enable state, in accordance with the relationship between the address ADS and the address ADE.

With reference to FIGS. 4A to 4D, the principle for determining the memory blocks by the comparator 40 will be described, wherein these figures show ranges of cells belonging to a column C1, sandwiched between columns C0 and C2 across multiple memory blocks, which are defined by the addresses ADS and ADE and are now being subjected to writing operations.

Figure 4A:
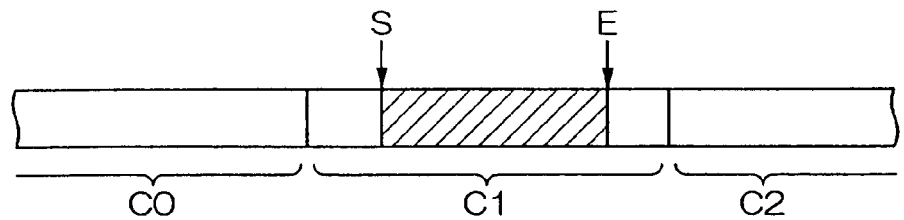
FIG. 4A shows a range of cells all belonging to column C1 sandwiched between columns C0 and C2, which are defined between addresses ADS and ADE.

Specifically, FIG. 4A shows a specific range of cells all belonging to the column C1, which are defined between the addresses ADS and ADE and are simultaneously selected by the write controller 50.

Figure 4B:
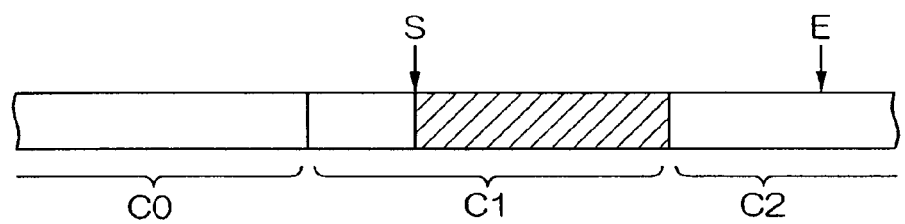
FIG. 4B shows a range of cells all belonging to column C1, the first one of which is designated by the address ADS.

FIG. 4B shows a range of cells all belonging to the column C1, the first one of which is designated by the address ADS, whereas the address ADE designates a cell belonging to the cell C2 next to the column C1. In this case, the write controller 50 simultaneously designates the cells, the first one of which is designated by the address ADS and the last one of which matches the last cell of the column C1.

Figure 4C:
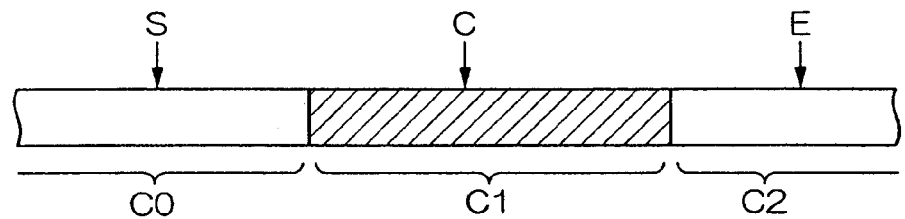
FIG. 4C shows a complete range of cells all belonging to column C1 within the range defined between the addresses ADS and ADE.

FIG. 4C shows the complete range of cells belonging to the column C1, whereas the address ADS designates a cell belonging to the column C0 prior to the column C1, and the address ADE designates a cell belonging to the column C2 next to the column C1. In this case, the write controller 50 simultaneously designates all of the cells belonging to the column C1 over the memory blocks 81 to 88.

Figure 4D:
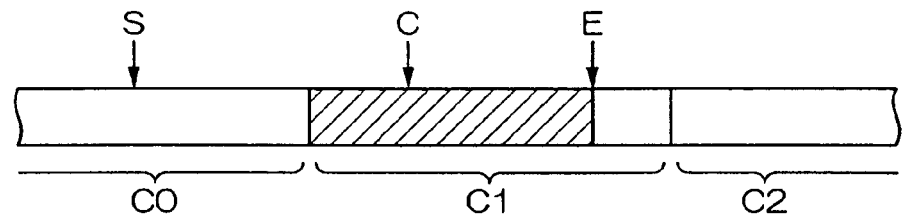
FIG. 4D shows a range of cells all belonging to column C1, the last one of which is designated by the address ADE.

FIG. 4D shows a specific range of cells all belonging to the column C1, whereas the address ADS designates a cell belonging to the column C0 prior to the column C1, and the address ADE designates a cell belonging to the column C1. In this case, the write controller 50 simultaneously designates the specific range of cells counting from the cell designated by the address ADS to the cell designated by the address ADE within the column C1 over the multiple memory blocks.

With reference to FIG. 1, when the comparator 40 compares the value '2' of the address ADS with the value '10' of the address ADE, the write controller 50 designates the aforementioned range of cells all belonging to the column C1 as shown in FIG. 4B, wherein the comparator 40 detects that the address ADE designates a cell of the column C2 next to the column C1, so that it forwards the detection result to the write controller 50. That is, based on the address ADSL consisting of low-order three bits of the address ADS, the write controller 50 controls the cell of the memory block 83 to the cell of the memory block 88 within the column C1 to be simultaneously placed in a write-enable state. That is, pixel data '0' is commonly written into the cells of the memory blocks 83 to 88 belonging to the column C1 collectively, thus realizing the comprehensive high-speed write operation with respect to the memory array 80.

Then, the write controller 50 outputs a trigger signal T to the counter 60, which in turns increments the address ADC by '1' so as to designate the column C2 now subjected to write operation. In this case, as similarly discussed in conjunction with FIG. 4D, the address ADS designates a cell belonging to the column C1 outside of the column C2 now subjected to write operation, and the address ADE designates a cell belonging to the column C2, so that the write controller 50 controls the cells all belonging to the column C2, which ranges from the first cell of the column C2 to a specific cell (corresponding to the memory block 82) designated by the address ADEL consisting of low-order three bits of the address ADE, to be placed in a write-enable state, so that pixel data '0' is commonly written into the memory blocks 81 and 82 with respect to the column C2. Thus, based on the value '8' of the run-length data RL, the pixel data '0' is commonly written into the eight cells across the columns C1 and C2.

Thereafter, the next pixel data (such as '4') are sequentially written into the corresponding memory blocks. Thus, the image data DG are expanded into parallel data, which are stored in the memory array 80.

The pixel data stored in the memory array 80 are respectively read out with respect to columns, wherein the multiplexer 70 selects the address ADDR as the address AD, which is supplied to the memory array 80. Thus, each of the columns of the memory array 80 is adequately selected so as to read out the pixel data DP1 to DP8 stored therein.

Of course, this invention is not necessarily limited to the present embodiment, which can be modified within the scope of the invention. For example, the storage device of the present embodiment deals with serial data comprising pixel data; however, it can be easily modified to deal with any other serial data subjected to run-length coding.

Incidentally, this invention is not necessarily limited to storage devices and can be realized by storing methods and storage media, for example.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A storage device comprising:
   a memory array including a plurality of memory blocks, each of which includes plural lines of cells in correspondence with a data length;
   a first register for storing a first address representing a first cell within a region for storing a specific number of data each having a same value;
   an adder for adding run-length data representing the specific number of the data each having the same value to the first address so as to produce a second address;
   a second register for storing the second address;
   a counter for supplying a write address designating a cell of the memory array subjected to a write operation;
   a multiplexer for outputting the write address supplied from the counter to the memory array when performing the write operation and for outputting a read address to the memory array when performing a read operation; and
   a controller for selecting a certain number of the cells within a line designated by the write address based on the first address and the second address within the memory array to be simultaneously placed in a write-enable state,
   wherein, when the region for storing the specific number of data, which are specified by the first address and the second address, lies in two or more lines of the cells, the counter increases the write address from a first write address to a second write address during execution of the write operation for writing the data into the region, the controller changes the cells, which are simultaneously placed in the write-enable state, from a first number of cells designated by the first write address within a first line to a second number of cells designated by the second write address within a second line.

2. A storage device according to claim 1, wherein the first data are pixel data produced by run-length coding on serial data.

3. A method for controlling a storage device that includes a plurality of memory blocks, each of which includes plural lines of cells in correspondence with a data length, said method comprising:
   storing a first address representing a first cell within a region for storing a specific number of data each having a same value;
   adding run-length data representing the specific number of the data each having the same value to the first address so as to produce a second address;

storing the second address;

supplying a write address designating a cell of the memory array subjected to a write operation;

outputting the write address supplied from a counter to the memory array when performing the write operation and for outputting a read address to the memory array when performing a read operation; and selecting a certain number of the cells within a line designated by the write address based on the first address and the second address within the memory array to be simultaneously placed in a write-enable state, wherein, when the region for storing the specific number of data. which are specified by the first address and the second address, lies in two or more lines of the cells, the counter increases the write address from a first write address to a second write address during execution of the write operation for writing the data into the region, the controller changes the cells, which are simultaneously placed in the write-enable state, from a first number of cells designated by the first write address within a first line to a second number of cells designated by the second write address within a second line.

\* \* \* \* \*